US008555339B2

United States Patent
McGloin et al.

(10) Patent No.: US 8,555,339 B2
(45) Date of Patent: Oct. 8, 2013

(54) IDENTIFYING GUESTS IN WEB MEETINGS

(75) Inventors: Mark Alexander McGloin, Dublin (IE);
 Olgierd Stanislaw Pieczul, Dublin (IE);
 Mary Ellen Zurko, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/345,206

(22) Filed: Jan. 6, 2012

(65) Prior Publication Data

US 2013/0179941 A1 Jul. 11, 2013

(51) Int. Cl.
 *H04L 9/32* (2006.01)
(52) U.S. Cl.
 USPC .................................................. 726/2; 726/3
(58) Field of Classification Search
 USPC .................................. 726/1–7; 713/168–170
 See application file for complete search history.

(56) References Cited

U.S. PATENT DOCUMENTS

| 7,620,697 | B1 | 11/2009 | Davies |
| 8,209,310 | B1 * | 6/2012 | Metcalfe ........................ 707/705 |
| 8,271,595 | B2 * | 9/2012 | Qureshi et al. ................ 709/206 |
| 2011/0289433 | A1 * | 11/2011 | Whalin et al. ................ 715/753 |

FOREIGN PATENT DOCUMENTS

| JP | 2010-282596 | 12/2010 |
| WO | WO2005/008448 | 1/2005 |

* cited by examiner

*Primary Examiner* — Hosuk Song
(74) *Attorney, Agent, or Firm* — Jeffrey S. LaBaw; David H. Judson (57) ABSTRACT

A technique that identifies registered or guest users in web meetings of the type wherein users must follow a supplied URL to attend the meeting. Registered and guest users are provided different forms of the meeting invite URL. Each registered user receives a common web meeting link (a URL) that he must follow to join the meeting. This link forces the registered user to authenticate to the service when used. A guest user invitee receives a unique URL for the meeting that is generated with a nonce value associated with the guess user's contact information. The nonce value does not expose the contact information. To join the meeting, each registered user must follow the common web meeting link and authenticate to the service. True identities of the web meeting participants are displayed.

16 Claims, 3 Drawing Sheets

IDENTIFYING GUESTS IN WEB MEETINGS

BACKGROUND OF THE INVENTION

1. Technical Field

This disclosure relates generally to techniques to ensure that only permitted invitees can access and attend web conferences.

2. Background of the Related Art

A web conference is an online meeting in which a moderator of the meeting shares a real-time view of his/her computer screen with remote meeting participants. Web conferences are often used to facilitate the demonstration of new software, to give a web seminar, or to facilitate a variety of other types of presentations over the Internet. A web conference provides a "visual communication" and is often used in conjunction with a telephone service (e.g., a conference call) for audio support. In operation, the meeting moderator connects, most often using a browser, to a web conferencing service. The service allows the moderator the ability to share with meeting participants the real-time view of a particular application or an entire desktop screen. Similarly, each meeting participant accesses the service to view the shared content via a web browser on his/her machine.

Web meetings are a growing industry, as companies seek to reduce travel costs with collaborations partners. These meetings often can have very dynamic sets of participants. As those participants join meetings, the host typically relies on the invitees revealing their identity correctly. Where an invitee is a registered user of the web conference software (e.g., a cloud-based service such as IBM® LotusLive™) and authenticates to that software, the meeting software can display the user's registered identity and the host is assured that the user is who he or she represents. When, however, the user is not registered or chooses not to authenticate, the user enters the meeting as a so-called "guest." A guest user is asked to enter his or her identity. In this circumstance, the guest user can enter any identity, including a third person's identity, a false identity, or a fictitious identity. In this circumstance, the host cannot be assured that the guest user is who he is she represents. This problem (of identifying a guest in a web meeting) is exacerbated in larger meetings, wherein invitees impersonate other users or listen into meetings from which they were not invited but for which they know or can obtain the meeting location (a Uniform Resource Locator, or URL).

There is a need in the web conferencing art to provide improved techniques for identifying guests in web meetings.

BRIEF SUMMARY

The disclosed technique identifies guests in web meetings of the type wherein users must follow a supplied URL to attend the meeting. A user who can follow a supplied URL (a "meeting invite") to join the web meeting is an "invitee." A "registered" user is one who receives the meeting invite, is registered with the web meeting service, and who can authenticate to the service to join the meeting. A "guest" user is one who receives the meeting invite but that is not registered with the web meeting service. According to this disclosure, registered and guest users are provided different forms of the meeting invite. Each registered user receives a common web meeting link (a URL) that he or she must follow to join the web meeting. This common web meeting link is such that it forces the registered user to authenticate to the service when used, and thus, when invited to the meeting in this manner, a registered user cannot join the meeting as a "guest." A guest user invitee receives a different type of meeting invite. In particular, the guest invitee receives a unique URL for the meeting that is generated with a nonce value that is associated with the guess user's contact information. Preferably, the unique URL is valid only for the expected duration of the meeting. Although linked to the guest user's contact information, the nonce value does not expose that information (in the URL itself), and the nonce value is such that the contact details are infeasible to obtain (guess) from that value. Preferably, the unique URL also is valid only for the expected duration of the meeting. Each guest is provided the meeting invite (the URL that includes the nonce), preferably over a secure channel.

To join the web meeting, each registered user must follow the common web meeting link and authenticate to the service. Because the registered user must authenticate to join the meeting, the service obtains the registered user's identity and displays that identity (or some portion thereof) so that the registered user is identified as a meeting participant. Each guest user, however, must follow his or her unique URL to join the meeting. Upon selecting the unique URL, the guest user is permitted to join the meeting. The web meeting service receives the nonce in the unique URL and maps it to the guest user's contact details, which details the service knows and which were used to generate the nonce. The service then displays the guest user's contact details (or some portion thereof) as the guest user's identity. In this manner, the true identities of the web meeting participants are displayed.

In one embodiment, the above-described technique is performed in an apparatus comprising a processor, and computer memory holding computer program instructions that when executed by the processor perform the method.

In another embodiment, the above-described technique is performed by a computer program product in a computer readable medium for use in a data processing system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
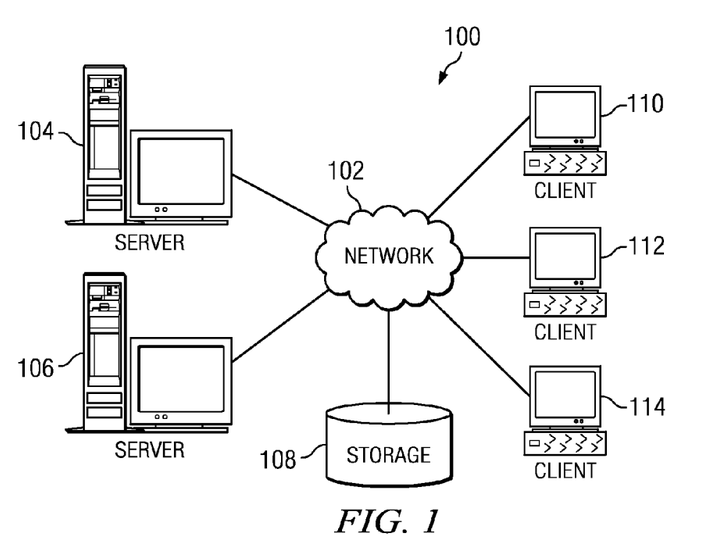
FIG. 1 depicts an exemplary block diagram of a distributed data processing environment in which exemplary aspects of the illustrative embodiments may be implemented.
Figure 2:
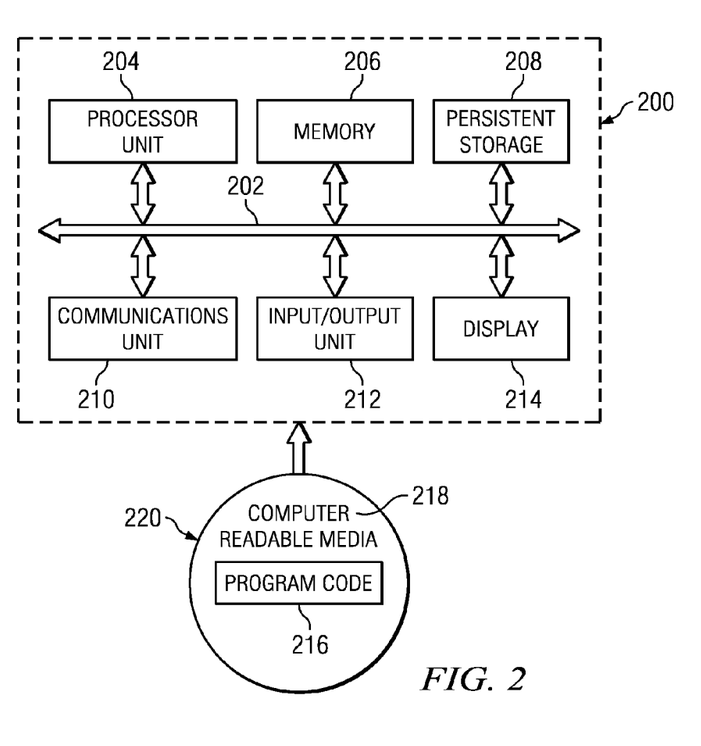
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

Client-Server Network Model

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
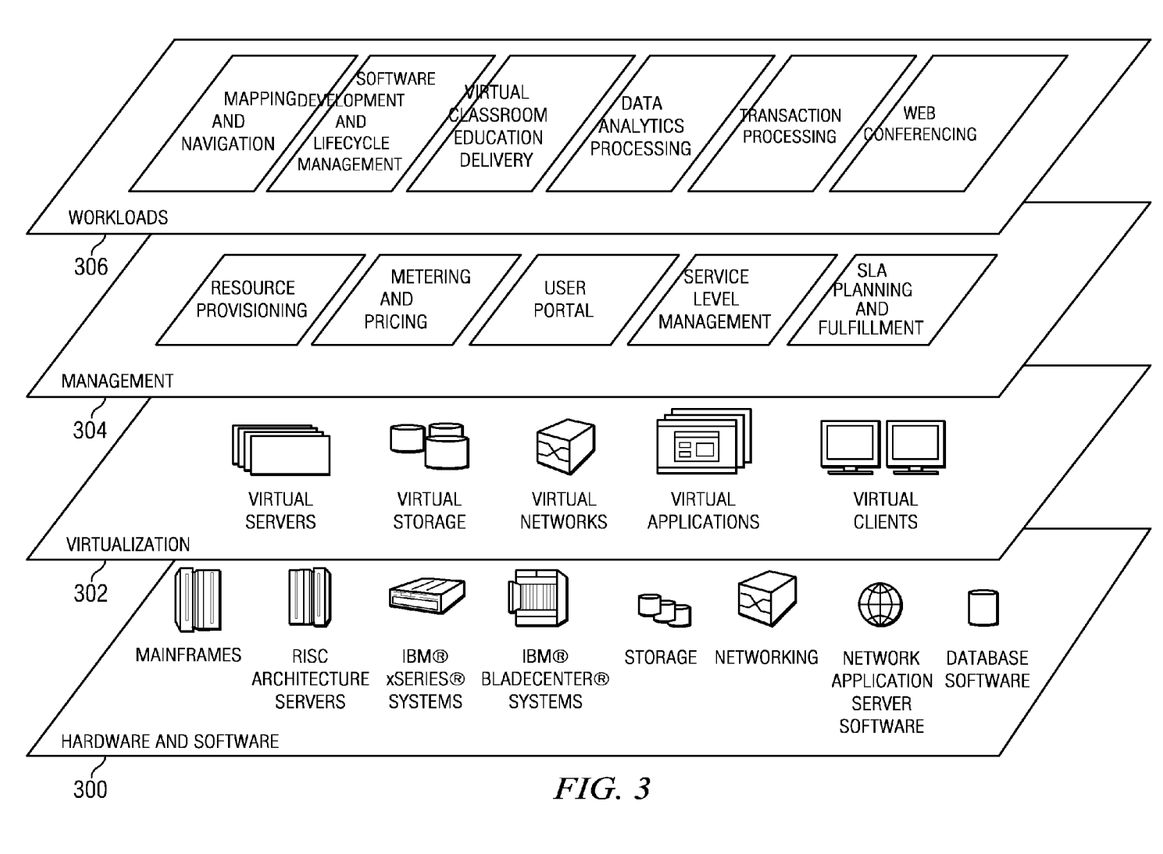
FIG. 3 depicts abstraction model layers of a cloud compute environment (a service provider) providing web conferencing and in which the disclosed technique may be practiced.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and web conferencing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components.

The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

A representative cloud-based client-server application is IBM® LotusLive, which provides a cloud-delivered suite of technologies that combine web conferencing, messaging, and collaboration services with social networking capabilities in an easy-to-use web-based environment.

Of course, the references herein to LotusLive are merely for the sake of illustration, and they are not intended to limit the scope of this disclosure.

Identifying Guests in Web Meetings

With the above as background, this disclosure provides a technique by which web meeting participant identities are obtained and displayed in such a manner that ensures that the identified participants are who they say they are. To this end, a registered user receives and must follow a common invite (a URL) to join the meeting such that the registered user cannot join the meeting as a "guest." When the registered user joins the meeting, information provided by the registered user during an authentication to the service (or the meeting) is then used to obtain identity information that is displayed as the user's identity. A guest user, however, receives a different form (type) of meeting invite from the invite provided to a registered user. In particular, and according to this disclosure, the guest user receives and must follow a unique URL (created especially for the guest user) to join the meeting; the unique URL includes a nonce value that is linked (but obscures) the guest user's contact information. Preferably, the guest user receives the unique URL over a secure channel. To join the web meeting, the guest user follows the unique URL (by selecting or clicking on the URL from a web browser), and the service uses the nonce to obtain and display the guest user's contact information (or some portion thereof) as the guest user's identity as such guest joins the meeting.

Thus, as used herein, "guest" users are those users not registered with the web meeting software or service. In contrast, "registered" users are those users that can authenticate with their registered identities to the web meeting system or service. Whether identified as a registered user or a guest user, the users have to follow a supplied URL to join the meeting. In this disclosure, the registered and guest users receive different types of invites, but in either case the "meeting invite" URL must be used to join the meeting. A user joins the meeting by opening his or her web browser to the meeting invite URL. Thus, the technique herein provides for a type of meeting that is sometimes referred to as a "participants identified" meeting. This is in contrast to other types of web meetings, such as "open to all," "only authenticated," "only authenticated users from a defined organization," or the like. The "participants identified" meeting is one in which the participants in the meeting are identified, as its name implies. The "participants identified" meeting provided by the techniques herein can co-exist with one or more other meeting types, or it may be implemented in a standalone manner.

Figures 4, 5:
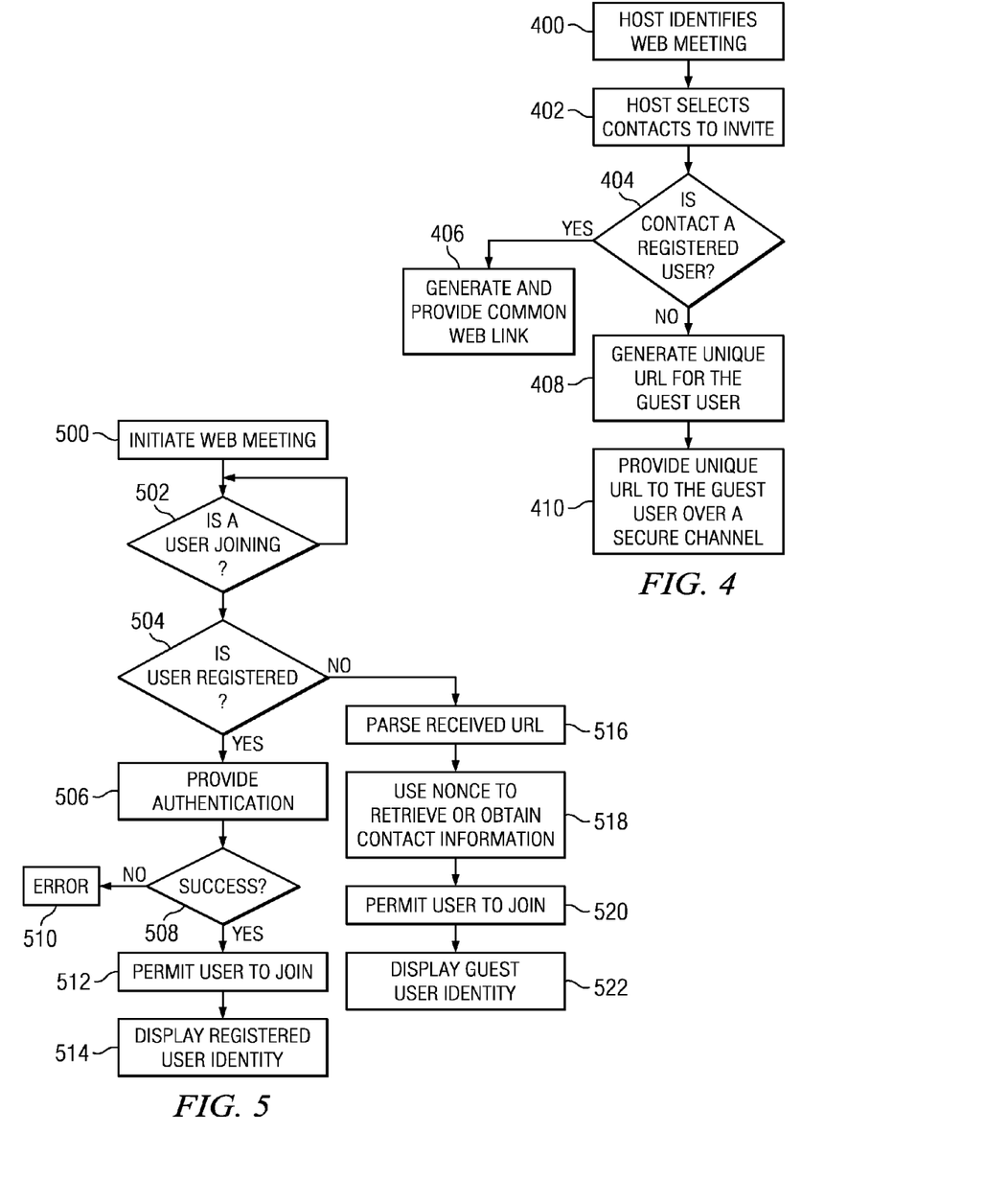
FIG. 4 depicts a process for creating a meeting invite according to this disclosure.
FIG. 5 depicts a process for identifying web meeting participants according to this disclosure.

FIG. 4 illustrates a process for creating a meeting invite according to this disclosure. In one embodiment, which is non-limiting, this process operates within or in association with the web meeting service (e.g., a web conferencing service such as a LotusLive) or system. In particular, it is well-known that a web meeting service of this type provides a web-based meeting configuration interface (a set of display screens or menus) by which a host sets up a web meeting. This type of interface may be of any convenient type, but it is typically a web page (or a set of web pages) that is accessed by a permitted host user (a person that authenticates to the meeting service) and is authorized to set up a web meeting. The web page typically includes data fields (HTML fill-in forms, text button, radio buttons, and the like) to enable the host to identify the meeting (by date, time and name), to include a set of participants to invite (typically identified in a contact list or lists), and to generate the meeting invite URLs. As noted above, the described technique operates in the context of a participants identified meeting, which assumes that the host has access to some form of contact information for each participant whom will be invited to the web meeting. Typically, the contact information includes a set of contact details such as, without limitation: name, email address, physical address, organization, department, division, group, or the like. The process begins at step 400 with the host identifying the web meeting that is being created. At step 402, the host selects the contacts to invite to the meeting. This selection typically is carried out against one or more predefined lists of contacts, although any selection technique may be used. At step 404, a test is performed for each selected contact to determine if they are a registered user with the web meeting software. This step may be carried out against one or more contacts at a time. If the contact is a registered user with the web meeting software, a common web meeting link is generated and provided to the registered user at step 406. The common web meeting link is provided to the registered user in any convenient manner, e.g., over e-mail, by text message, by instant message, by being published on a securely-accessible web page, or the like.

The common web meeting link, once received by a registered user, is such that it is the only "meeting invite" URL type that can be used by the registered user to join the meeting. In other words, once the registered user receives the common web meeting link, he or she can join the meeting only be selecting this link; he or she cannot join the meeting as a "guest." This ensures that only true "guest users" attend the web meeting as guests.

If the outcome of the test at step 404 indicates that the contact is not a registered user to the service, the routine branches to step 408. At this step, a unique URL for the meeting is generated.

In one embodiment, the unique URL includes a nonce value. A nonce value is one that is generated for this particular URL, preferably from given contact information associated with the guest user, but that does not expose those contact details (within the URL). In a simple form, the nonce is generated by applying a given function (such as a cryptographic function) to the guest user's contact details (or portions thereof). A representative cryptographic function is a one-way hash function, such as MD5, SHA-1, or the like, although other techniques and encoding schemes (such as simple checksums) may be used to generate the nonce. In a variant, the contact details are first concatenated with a timestamp that identifies some temporal aspect of the web meeting, such as when the meeting is intended to begin, when the meeting is intended to terminate, its duration, its date, or the like. In this case, the given function is applied to the contact details concatenated with the timestamp. Alternatively, the timestamp may be incorporated into the URL externally to the nonce. In yet another variant, the nonce is created by applying the given function to the contact information, the timestamp, and a value associated with a given domain or sub-domain. In this way, the nonce may also encode an additional value (the domain or sub-domain) from which the guest user must originate in order to join the meeting. Other data (such as an identifier for an organization, a billing code, or the like) may be encoded in or by the nonce to facilitate other operations such as billing, logging and the like.

In a representative embodiment of a cloud-based web meeting service, the guest user's contact detail is just an email name. Of course, any type of identifier may be used, and the service may have full or portion contact details from which to choose from to create the nonce value. The nonce value, however, is one that is included in the meeting invite URL but that does not expose the guest user's contact details (the user's email address, or other contact details). Because the nonce value is unique (at least with respect to the guest user's information from which it is obtained), the resulting meeting invite URL (that includes the nonce value) is also unique. This "guest URL" preferably also is only valid for the duration of the meeting, as previously described. The nonce value in effect encodes the guest user's contact information such that it is infeasible to guess from merely examining the URL itself.

Any encoding scheme may be used to create the nonce value provided the value is such that the guest user's contact details are infeasible to guess (from the nonce value). As noted above, preferably the timestamp (or other temporal information) also is encoded with the contact details, but this is not required. The service may use other means to restrict use of the nonce to a permitted time period (presumably the duration of the web meeting, or some other associated period).

At step 410, the unique URL for the guest user is provided to the guest user, preferably over a secure channel. In one embodiment, the secure channel is an SSL-protected web page. In another embodiment, the guest URL is provided over secure transport as an email message, a text message, an instant message, or the like.

FIG. 5 illustrates a process for displaying a user's identity. The process assumes that the registered and guest users have received their respective meeting invite URLs as described above. The process begins at step 500 upon initiation of the web meeting in the usual manner. At step 502, a test is performed to determine whether a user is attempting to join the web meeting. If not, the routine cycles. Upon a positive outcome of the test at step 502, a test is performed at step 504 to determine whether the user attempting to join the meeting is a registered user. If so, the routine branches to step 506 to request that the purported registered user provide an authentication. This is a well-known function. Thus, in one embodiment, the registered user is requested to authenticate by entering a user identifier and password, although any form of authentication may be used. A test is then performed at step 508 to determine whether the user has authenticated (is recognized by the service as a registered user). If not, an error message is returned to the user at step 510. As noted above, preferably a registered user is only permitted to join the meeting by following the common web link provided in the meeting invite and provided further that the user can authenticate to the service and/or the meeting successfully. If the outcome of the test at step 508 indicates that the registered user is recognized as such by the service, the routine continues at step 512 by permitting the registered user to join the meeting. The registered user's identity is then displayed in the meeting at step 514. This identity typically is distinct from the user's authentication information. In the cloud-based environment, the identity may be the registered user's email address.

If the outcome of the test at step 504 indicates that the user is not attempting to join as a registered user, then the user must be a guest user. The routine then continues at step 516 to parse the received URL (which is received by the web meeting service) for the nonce. At step 518, the nonce value in the received URL is used to retrieve the guest user's contact information, which has been saved by the service (e.g., during the generation of the unique URL) or is otherwise available to the service. In one embodiment, the nonce value is an index into a database in which the guest user contact information is stored. If desired, a test may be performed at the service to determine whether the nonce can be re-generated from the retrieved contact information. At step 520, guest user is permitted to join the meeting. At step 522, the guest user contact information (or portion thereof), or some other guest user identifier, is displayed. In a cloud-based web meeting service, preferably the identifier is the guest user's email. This completes the process.

The above process flow may be varied. Thus, for example, step 504 may test whether the user is attempting to join as a guest user. Step 518 may be varied as needed depending on how the service associates the nonce value to the guest user's contact details. Other variations on the basic functionality would be recognized by one of ordinary skill but are within the scope of this disclosure.

Several variations of the disclosed technique may be implemented. For example, a protected meeting associated with a Company (or some group or division thereof) can be restricted to certain individuals within the group or division. One way to accomplish this restriction is to encode organization-specific information into the guest user nonce and to further restrict registered users to only those originating from the authorized Company domain or sub-domain. If the cloud service enables a Company to define Company organizations, the encodings/restrictions may then be enforced against the defined Company organization boundaries. Thus, for example, the cloud service may define a permitted subscriber as an individual who has an email address ending in a given alias, e.g., *.ibm.com. By restricting the meeting to all subscribers in the organization that have that email alias, the service can provide fine-grained control over meeting participants. Using this approach, for example, the web meeting is a protected web meeting restricted to the subscribers in a defined organization (who may be the registered users) and guests who receive their URL at an email domain associated with the defined organization.

Preferably, the web meeting service enforces some notion of continuous identity associated with a nonce value so that the guest URLs need not necessarily be re-created for every meeting, especially those meetings that take place periodically and that a guest user is anticipated to attend regularly. This type of feature provides additional advantages, such as pre-filling a display name (once the guest user selects the guest user), as well as simplifying logging and auditing.

As an alternative embodiment, the nonce value does not need to be calculated based on guest user details, but rather may be a random or pseudo-random number that is stored server-side against the guest user's contact details.

The disclosed technique provides significant advantages. Both registered and guest users are properly identified as web meeting participants, and a host is substantially assured that meeting participants are who they say they are. The common web link provided to registered users ensures that even those users cannot "game" the meeting, e.g., by attending as guests, and the unique URL provided to a guest user typically ensures that the identified guest user really is present at the meeting. The guest URL, however, does not expose the guest's contact details, protecting the user's private information (in the meeting invite).

In a representative, but non-limiting, implementation, a representative cloud service is LotusLive, and the identity provider (IdP) is implemented in Tivoli Federated Identity Manager (TFIM). These products and services are available from IBM Corporation, of Armonk, N.Y.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

The techniques herein are not limited to use with a cloud service. The above-described technique also may be implemented in any web meeting software.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

The web meeting software in which the disclosed technique may be practiced may be on-premises software used to invite people outside an organization to a web meeting.

Still more generally, the subject matter described herein can take the form of an entirely hardware embodiment, an entirely software embodiment, or an embodiment containing both hardware and software elements. In a preferred embodiment, and as noted above, the identity provider and the described "impersonation" function is implemented in software, which includes but is not limited to firmware, resident software, microcode, and the like. The "token" may be any generic data string or structure that can be transported over a link and/or stored in a data store, such as computer memory.

Furthermore, the web meeting functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the web meeting components are implemented in a special purpose computer, preferably in software executed by one or more processors. The software also is maintained in one or more data stores or memories associated with the one or more processors, and the software may be implemented as one or more computer programs.

The web meeting planning and user identity function may be implemented as an adjunct or extension to an existing security (authentication) service, or access manager solution. The technique also may be implemented in an automated manner, as has been described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application. Further, while typically the client-server interactions occur using HTTP, this is not a limitation either. The client server interaction may be formatted to conform to the Simple Object Access Protocol (SOAP) and travel over HTTP (over the public Internet), FTP, REST, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Having described our invention, what we now claim is as follows:

1. Apparatus, comprising:
   a processor;
   computer memory holding computer program instructions that when executed by the processor perform a method of managing users in web meetings, wherein a user must follow a meeting invite URL to join the web meeting, the method comprising:
      providing each user that is a registered user with a first type of meeting invite URL;
      providing each user that is a guest user with a second type of meeting invite URL that is distinct from the first type of meeting invite URL, the second type of meeting invite URL including a value uniquely associated with the guest user;
      responsive to receipt of an indication that a registered user has selected the first type of meeting invite URL to join the web meeting, joining the registered user to the web meeting if the registered user is authenticated; and
      responsive to receipt of an indication that a guest user has selected the second type of meeting invite URL provided to the guest user, joining the guest user to the web meeting.

2. The apparatus as described in claim 1 wherein the method further includes:
   for each guest user, using the value uniquely associated with the guest user to obtain identity information; and
   displaying the identity information.

3. The apparatus as described in claim 1 wherein the value uniquely associated with the guest user is associated with one or more contact details of the guest user.

4. The apparatus as described in claim 3 wherein the value is a nonce value that does not expose the one or more contact details of the guest user.

5. The apparatus as described in claim 1 wherein the value is generated by applying a given function to one or more contact details of the guest user and, optionally, other information.

6. The apparatus as described in claim 1 wherein the second type of meeting invite URL is valid for a given time period.

7. The apparatus as described in claim 1 wherein the web meeting is a protected web meeting restricted to registered users in a defined organization and to guests who receive the second type of meeting URL at an email domain associated with the defined organization.

8. A computer program product in a non-transitory computer readable medium for use in a data processing system, the computer program product holding computer program instructions which, when executed by the data processing system, perform a method of managing users in web meetings, wherein a user must follow a meeting invite URL to join the web meeting, the method comprising:
   providing each user that is a registered user with a first type of meeting invite URL;
   providing each user that is a guest user with a second type of meeting invite URL that is distinct from the first type of meeting invite URL, the second type of meeting invite URL including a value uniquely associated with the guest user;
   responsive to receipt of an indication that a registered user has selected the first type of meeting invite URL to join the web meeting, joining the registered user to the web meeting if the registered user is authenticated; and
   responsive to receipt of an indication that a guest user has selected the second type of meeting invite URL provided to the guest user, joining the guest user to the web meeting.

9. The computer program product as described in claim 8 wherein the method further includes:
   for each guest user, using the value uniquely associated with the guest user to obtain identity information; and
   displaying the identity information.

10. The computer program product as described in claim 8 wherein the value uniquely associated with the guest user is associated with one or more contact details of the guest user.

11. The computer program product as described in claim 10 wherein the value is a nonce value that does not expose the one or more contact details of the guest user.

12. The computer program product as described in claim 8 wherein the value is generated by applying a given function to one or more contact details of the guest user and, optionally, other information.

13. The computer program product as described in claim 8 wherein the second type of meeting invite URL is valid for a given time period.

14. The computer program product as described in claim 8 wherein the web meeting is a protected web meeting restricted to registered users in a defined organization and to guests who receive the second type of meeting URL at an email domain associated with the defined organization.

15. Apparatus, comprising:
    a processor;
    computer memory holding computer program instructions that when executed by the processor perform a method of managing users in web meetings, wherein a user must following a meeting invite URL to join the web meeting, the method comprising:
       providing each user that is a registered user with a first type of meeting invite URL;
       providing each user that is a guest user with a second type of meeting invite URL that is distinct from the first type of meeting invite URL, the second type of meeting invite URL including a value uniquely associated with the guest user, the value having been generated by applying a given function to (i) one or more contact details of the guest user, and, optionally (ii) other information that is one of: a timestamp, a domain, a sub-domain, an organization, and security data;
       responsive to receipt of an indication that a registered user has selected the first type of meeting invite URL to join the web meeting, joining the registered user to the web meeting if the registered user is authenticated; and
       responsive to receipt of an indication that a guest user has selected the second type of meeting invite URL provided to the guest user, joining the guest user to the web meeting.

16. A computer program product in a non-transitory computer readable medium for use in a data processing system, the computer program product holding computer program instructions which, when executed by the data processing system, perform a method of managing users in web meetings, wherein a user must following a meeting invite URL to join the web meeting, the method comprising:
- providing each user that is a registered user with a first type of meeting invite URL;
- providing each user that is a guest user with a second type of meeting invite URL that is distinct from the first type of meeting invite URL, the second type of meeting invite URL including a value uniquely associated with the guest user, the value having been generated by applying a given function to (i) one or more contact details of the guest user, and, optionally (ii) other information that is one of: a timestamp, a domain, a sub-domain, an organization, and security data;
- responsive to receipt of an indication that a registered user has selected the first type of meeting invite URL to join the web meeting, joining the registered user to the web meeting if the registered user is authenticated; and
- responsive to receipt of an indication that a guest user has selected the second type of meeting invite URL provided to the guest user, joining the guest user to the web meeting.

* * * * *